(12) United States Patent
Click, Jr. et al.

(10) Patent No.: US 6,434,743 B1
(45) Date of Patent: Aug. 13, 2002

(54) METHOD AND APPARATUS FOR ALLOCATING STACK SLOTS

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/298,318

(22) Filed: Apr. 23, 1999

(51) Int. Cl.$^7$ ................................................. G06F 9/45
(52) U.S. Cl. ....................................................... 717/157
(58) Field of Search ........................ 717/9, 5, 140–148, 717/151–158; 345/440

(56) References Cited

U.S. PATENT DOCUMENTS

| | | | | |
|---|---|---|---|---|
| 5,249,295 A | * | 9/1993 | Briggs et al. | 395/650 |
| 5,418,958 A | * | 5/1995 | Goebel | 395/700 |
| 5,428,793 A | * | 6/1995 | Odnert et al. | 395/700 |
| 5,493,675 A | * | 2/1996 | Faiman, Jr. et al. | 395/700 |
| 5,987,259 A | * | 11/1999 | Goebel | 395/709 |
| 6,139,200 A | * | 10/2000 | Goebel | |

\* cited by examiner

*Primary Examiner*—Kakali Chaki
*Assistant Examiner*—Chuck Kendall
(74) *Attorney, Agent, or Firm*—Beyer Weaver & Thomas LLP

(57) ABSTRACT

Methods and apparatus for allocating and using stack space are disclosed. According to one aspect of the present invention, a computer-implemented method for allocating stack space in an object-based system includes obtaining source code that is suitable for compilation and includes a definition associated with a variable. During register allocation, stack slots and machine registers are treated substantially similarly. This includes the steps of building an interference graph, copy coalescing, attempting to color the interference graph, and determining if the attempt to color the interference graph is successful. If the coloring attempt is not successful, then in lieu of normal spill code being inserted, register-to-register copies, e.g., "reg-reg" copies, are inserted in the source code. The "reg-reg" copies include copies associated with both stack slots and machine registers.

15 Claims, 8 Drawing Sheets

```
                                            ┌─104
int program ( int a) {
    int B, C, D;
    if (A)  {
        C = array[0];      ┐ C LIVE    ┐ A LIVE
        D = array[1];      │ RANGE     │ RANGE
        array[D] = C;      ┘           │
108 ⌒ B = A + 1;              ┐ D LIVE  │
    } else  {                  │ RANGE   │
112 ⌒ B = A + 2;              ┘         │
        C = array[2];      ┐ C LIVE   B LIVE
        D = array[3];      │ RANGE    RANGE
        array[D] = C;      ┘                
    }                         ⌐ 120
114 ⌒ return B;           D LIVE
}                         RANGE
```

```
.
.
.
copy B      ~312
copy A      ~310
C = A + B   ~308
copy C      ~314
D = A + C
copy D
.
.
.
copy B
F = B + 2
copy F
.
.
.
copy A
G = A + 2
copy G
.
.
.
```

METHOD AND APPARATUS FOR ALLOCATING STACK SLOTS

CROSS REFERENCE TO RELATED APPLICATION

This application is related to U.S. Ser. No. 09/298,411, filed concurrently herewith, which is incorporated herein by reference in its entirety.

BACKGROUND OF THE INVENTION

1. Field of Invention

The present invention relates generally to methods and apparatus for improving the performance of software applications. More particularly, the present invention relates to methods and apparatus for allocating stack slots in substantially the same manner that is used to allocate registers.

2. Description of the Related Art

In an effort to increase the efficiency associated with the execution of computer programs, many computer programs are "optimized." Optimizing a computer program generally serves to eliminate portions of computer code which are essentially unused. In addition, optimizing a computer program may restructure computational operations to allow overall computations to be performed more efficiently, thereby consuming fewer computer resources.

An optimizer is arranged to effectively transform or a computer program, e.g., a computer program written in a programming language such as C++, FORTRAN or Java bytecodes, into a faster program. The faster, or optimized, program generally includes substantially all the same, observable behaviors as the original, or preconverted, computer program. Specifically, the optimized program includes the samemathematical behavior has its associated original program. However, the program generally recreates the same mathematical behavior with fewer computations.

As will be appreciated by those skilled in the art, an optimizer generally includes a register allocator that is arranged to control the use of registers within an optimized or otherwise compiled, internal representation of a program. A register allocator allocates register space in which data associated with a program may be stored. A register is a location associated with a processor of a computer that may be accessed relatively quickly, as compared to the speed associated with accessing "regular" memory space, e.g., stack or heap space, associated with a computer.

The number of registers in a processor is fixed. As a result, when there is not enough register space available for the storage of data, "spill code" is identified. The spill code is code that moves data between stack slots and registers when all registers are full. A stack slot is a piece of a stack frame that an allocator uses to hold information when all registers are full. Typically, an optimizer includes a specialized stack slot allocator that is arranged to allocate stack slots for spill code as needed. Stack slots are also generally needed when passing more arguments than fit in the registers.

FIG. 1a is a diagrammatic representation of a segment of source code. Segment 104 of source code includes uses of variables. By way of example, an instruction 108 includes a use of a variable A which is stored in a register, e.g., register R1. Instruction 108 sets a variable B to equal the sum of variable A and an integer "1". Variable B may be stored into a register R2. In addition to being used in instruction 108, variable A is used in instruction 112 as well. Variable B, as shown, is used in instruction 114.

A live range for variable B, i.e., "B live range" 120, is defined as a range in segment 104 over which variable B must remain live. That is, B live range 120 is the "distance" over which a value for variable B needs to be maintained in a register, e.g., register R2. "A live range" 122, or the distance over which variable A must be maintained in a register, overlaps B live range 120. The overlapping live ranges 120, 122 indicate that both variable A and variable B are to remain in their respective registers simultaneously over a certain distance. As shown, a first "C live range" 124 indicates that variable C is live in a register only until variable D is set. Therefore, variable C and variable D may in some cases be assigned to the same register.

An interference graph associated with segment 104 may be colored in order to assign registers to segment 104 without conflicts, e.g., without interference. The coloring, and subsequent register allocation, may be performed using a variety of different processes including, but not limited to, a Chaitin coloring heuristic developed at International Business Machines, Inc., of Yorktown Heights, N.Y. and a Briggs-Chaitin coloring algorithm, described in *Register Allocation via Graph Coloring*, by Preston Briggs (PhD thesis, Rice University, 1992), which is incorporated herein by reference. FIG. 1b is a diagrammatic representation of an interference graph that is associated with segment 104 of FIG. 1a. An interference graph 132 includes nodes 134 that are associated with variables A, B, C, D.

Edges 138 are included between two nodes that need to be live at the same time. As shown edge 138a is present between node A 134a and node D 134d, thereby indicating that variables A and D are alive at the same time. Similarly, the edge between node B 134b and node C 134c indicates that variables B and C also need to be live at the same time.

Interference graph 132 is arranged such that when it is successfully colored, registers may be assigned to associated nodes 134 without conflicts. Hence, coloring interference graph 132 with colors generally involves assigning colors, e.g., register numbers, to nodes 134 of interference graph 132. Interference graph 132 indicates that three registers are needed for segment 104 of source code as shown in FIG. 1a. Node A 134a and node B 134b each require individual registers, while node C 134c and node D 134d may share a register.

In general, since interference graphs may not always be colored with as few colors as the CPU has registers, a spill will occur in which some data is spilled into stack slots. By way of example, a spill may occur when two variables or values attempt to occupy a single register at any given time. When two values attempt to substantially simultaneously occupy a single register, because a register allocator has reached a stage where it is not possible to guarantee each value its own register, one of the values must be spilled into a stack slot. The identification of a value that may be spilled into a stack slot is considered to be the identification of a spill candidate. The register allocator attempts to assign colors to the interference graph such that no two nodes connected by an edge have the same color. Further, the register allocator attempts to use no more than k colors, where k is the number of registers in the central processing unit (CPU), i.e., 8 on Intel 80×86 CPUs and 32 on most RISC CPUs. When it is not possible, or when the algorithm used to color the interference graph does not find a k coloring, then some live ranges must be spilled.

For a hypothetical 2-register machine, interference graph 132 of FIG. 1b may not be colored. For example, an assumption may be made that live ranges associated with variables A and B are identified as spill candidates. A register allocator inserts stores and loads around definitions and uses, as shown in FIG. 1c. At the same time, stack slots must be allocated for use in storing spill code. In this example, separate stack slots are used for spilling live range A and live range B, yet only one of those two live ranges is ever alive at the same time. The interference graph for spilled program 104' is given in FIG. 1d. Interference graph 180 of FIG. 1d may be colored using only 2 colors, e.g., machine registers.

The use of store and load instructions allows values to be stored and retrieved, as will be appreciated by those skilled in the art. Further, the use of store and load instructions is associated with the allocation of stack space, or, more specifically, stack slots. FIG. 2 is a process flow diagram which illustrates the steps associated with allocating stack space in response to coloring an interference graph. The process of allocating memory associated with a segment of source code begins at step 202 in which an interference graph, e.g., interference graph 132 of FIG. 1b, is constructed for the segment of source code.

After the interference graph is constructed, an attempt is made to color the interference graph in step 206. As previously discussed, a variety of different methods may be applied in an attempt to color the interference graph. Once the attempt is made to color the interference graph in step 206, a determination is made in step 210 as to whether the attempt to color the interference graph was successful. In other words, a determination is made regarding whether each variable associated with the interference graph was successfully assigned to a register without conflict.

If the determination is that the attempt to color was not successful, then the implication is that not enough registers are available for each variable in the segment of source code to be assigned a register without interference. Accordingly, process flow moves from step 210 to step 214 in which a list of live ranges is obtained as spill candidates. That is, variables that may be spilled into stack slots are identified.

Once spill candidates are identified, then in step 218, load instructions and store instructions are assigned around definitions and uses in the segment of source code. Specifically, a load command to load a variable is inserted before a use of the variable in the segment of source code, while a store instruction to store a variable is inserted after the variable is defined in the segment of source code. After the load instructions and store instructions, i.e., loads and stores, are assigned, a stack slot is allocated for each live range in step 222. In general, a stack slot allocator which is separate from a register allocator is used to allocate the stack slots. While a stack slot allocator is separate from a register allocator, it should be understood that both allocators might be included in an optimizer or a compiler. Allocating the stack slots allows spill candidates to be spilled into the stack slots. From step 22, process flow returns to step 202 where a new interference graph is constructed.

Returning to step 210, if the determination that the attempt to color the interference graph was successful, then the implication is that each variable has successfully been associated with either a register or a stack slot. Hence, process flow moves to step 226 in which the stack containing stack slots is cleaned. Cleaning the stack slots includes a series of relatively simple steps, as will be understood by those of skill in the art. Such steps typically include converting stack slot references into actual offsets and placing the offsets into the associated spill instructions.

If a register allocator simply assigns a single stack slot per spill candidate, it will generate stack frames that are lightly used. Large frames, such as those which are not dense, consume memory, as well as data cache, without significant gain. Large frames are also associated with problems on machines that cannot directly access large offsets from a stack pointer. By way of example, Sparc computers require a second instruction to access stack slots which are located more than 4096 bytes away. Typically, allocators attempt to reuse stack slots in order to minimize frame size. Heuristics that are often implemented to reuse stack slots generally behave in an unpredictable manner, thereby leading to unreliable, e.g., bug-filled, code, as will be appreciated by those skilled in the art.

The implementation of a stack slot allocator is often inefficient, leading to stack frames filled with stack slots which are generally unused over large portions of the program. This causes the stack frames to be unnecessarily large, requiring large amounts of memory and, as a result, slowing the execution of a program. Additionally, the heuristics associated with the implementation of a stack slot allocator, e.g., attempts to reuse stack slots, operate in an ad-hoc manner.

Therefore, what is desired is an efficient method for handling values that are stored in stack slots. Specifically, what is needed is an efficient method and apparatus for allocating and using stack space such that the allocation and the use of the stack space is substantially the same as the allocation and the use of register space.

SUMMARY OF THE INVENTION

The present invention relates to allocating and using stack space. According to one aspect of the present invention, a computer-implemented method for allocating stack space in an object-based system includes obtaining source code that is suitable for compilation and includes a definition associated with a variable. Once the source code is obtained, a first copy instruction is inserted into the source code sequentially after the definition associated with the variable. Then, a first stack slot is allocated for the first copy instruction, and the first stack slot is associated with a stack frame such that the size of the stack frame is determined. In one embodiment, the method further includes creating an interference graph associated with the source code, attempting to color the interference graph, and determining if the attempt to color the interference graph is successful. If the coloring attempt is not successful, then the first copy instruction is inserted in the source code.

By inserting a copy instruction, which may be associated with a load, a store, or a register-register copy, around definitions and uses of variables, stack slots may be allocated using the same mechanisms that are used to allocate registers. Using the same mechanisms to allocate registers and stack slots enables complications associated with assigning stack slot values using a generally complex, separate mechanism to be avoided. Hence, source code that uses stack slot allocation that is performed using the same mechanisms that are used to allocate registers may generally execute more efficiently and more reliably.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation of an interference graph associated with source code 104 of FIG. 1a.

DETAILED DESCRIPTION OF THE EMBODIMENTS

An optimizer, or a compiler, often includes a stack slot allocator that is used to allocate stack slots to hold variables which may not be stored in registers due to the fact that the number of registers associated with a processor is finite. The stack slot allocator is typically activated during a register allocation process when it is determined through an interference graph coloring algorithm that not all variables may be assigned to a register without conflict. The heuristics associated with treating stack-based variables, as for example in an attempt to free memory space associated with unused stack slots, often causes bugs to arise in the execution of source code. Further, the use of stack slots is often inefficient, as many stack slots within a stack frame are used for only a small part of the program.

By treating stack-based values or variables in the same manner as machine registers, a specialized stack slot allocator will not be required. Eliminating such a stack slot allocator from a register allocation process increases the stability of the register allocator that is used to reduce register usage. Using a register allocator to allocate stack slots reduces stack slot usage, and generally allows for smaller and denser stack frames, a reduced cache footprint, and improved runtimes. In addition, using a register allocator to allocate stack slots enables the stack slots to be treated in the same manner as registers, thereby eliminating bugs associated with the heuristics that are commonly used to treat values store in stack slots.

In order to effectively implement stack slots as registers, the register allocator may be arranged such that it no longer inserts store and load instructions around spill code. Instead, the register allocator inserts copy instructions where the source and destination of the copy instruction may either be true machine registers or stack slots. After allocation succeeds, a subsequent cleanup pass will convert copies to and from stack slots and registers into stores or loads as required.

Figure 1A:
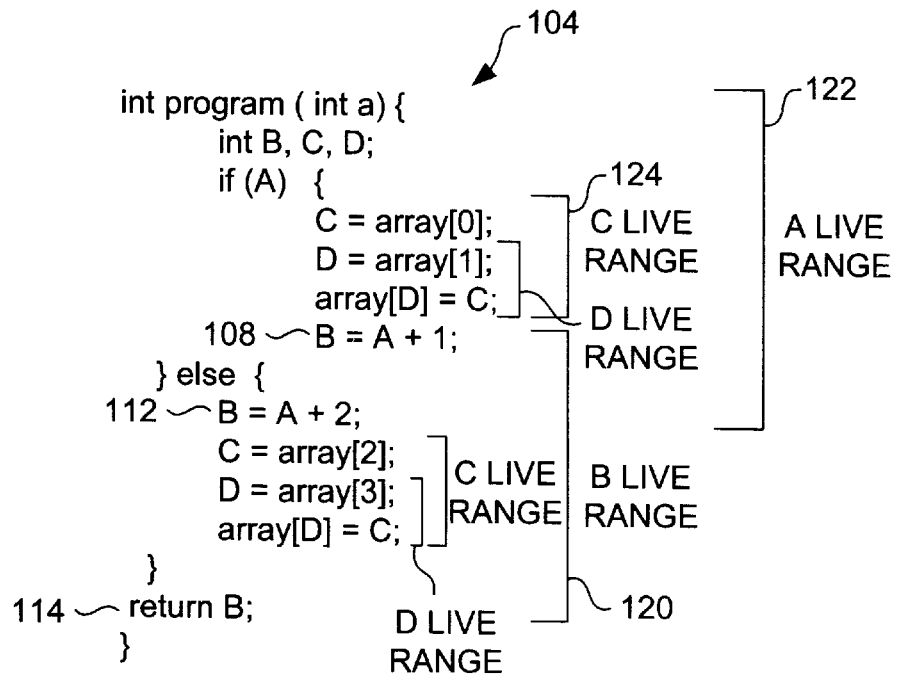
FIG. 1a is a diagrammatic representation of source code which includes live ranges for variables.
Figure 1B:
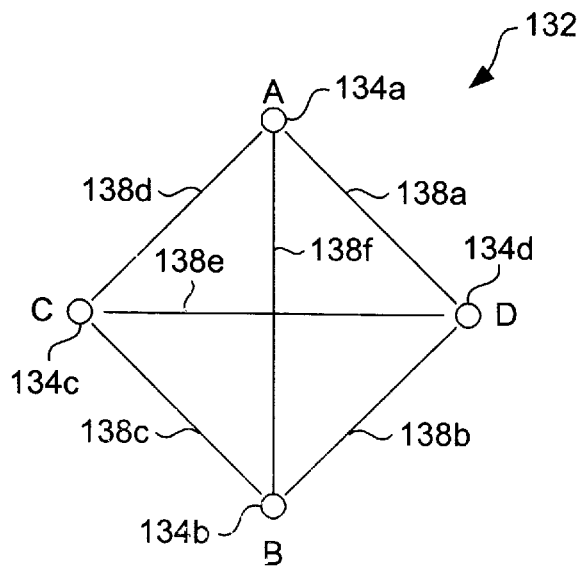
Figure 1C:
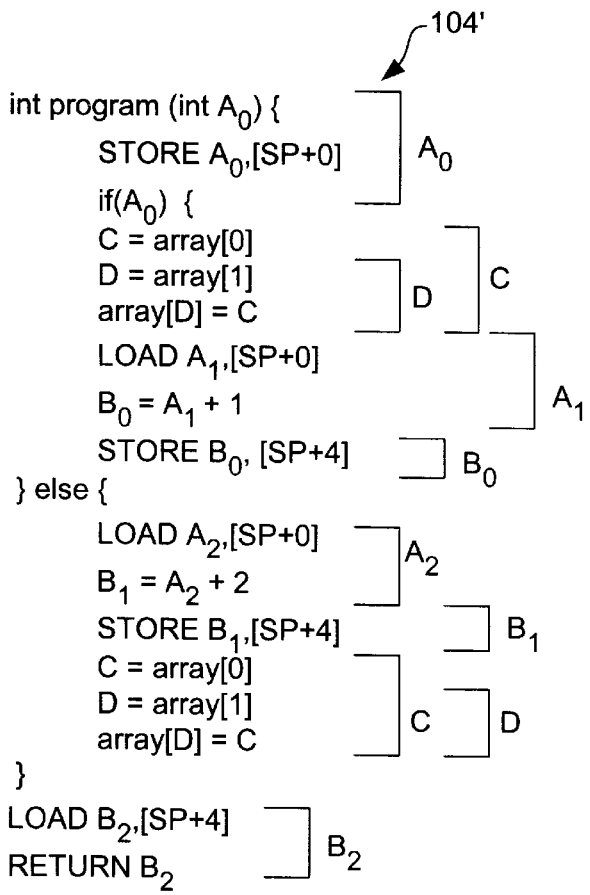
FIG. 1c is a diagrammatic representation of source code as augmented with store instructions and load instructions.
Figure 1D:
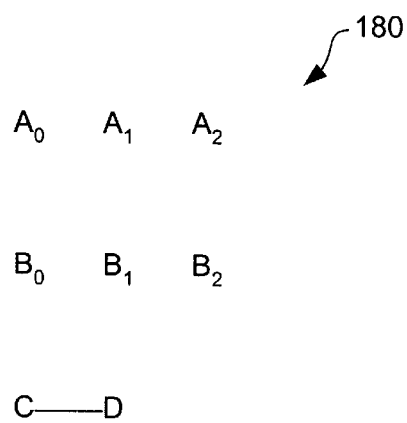
FIG. 1d is a diagrammatic representation of an interference graph associated with code 104' of FIG. 1c.
Figure 2:
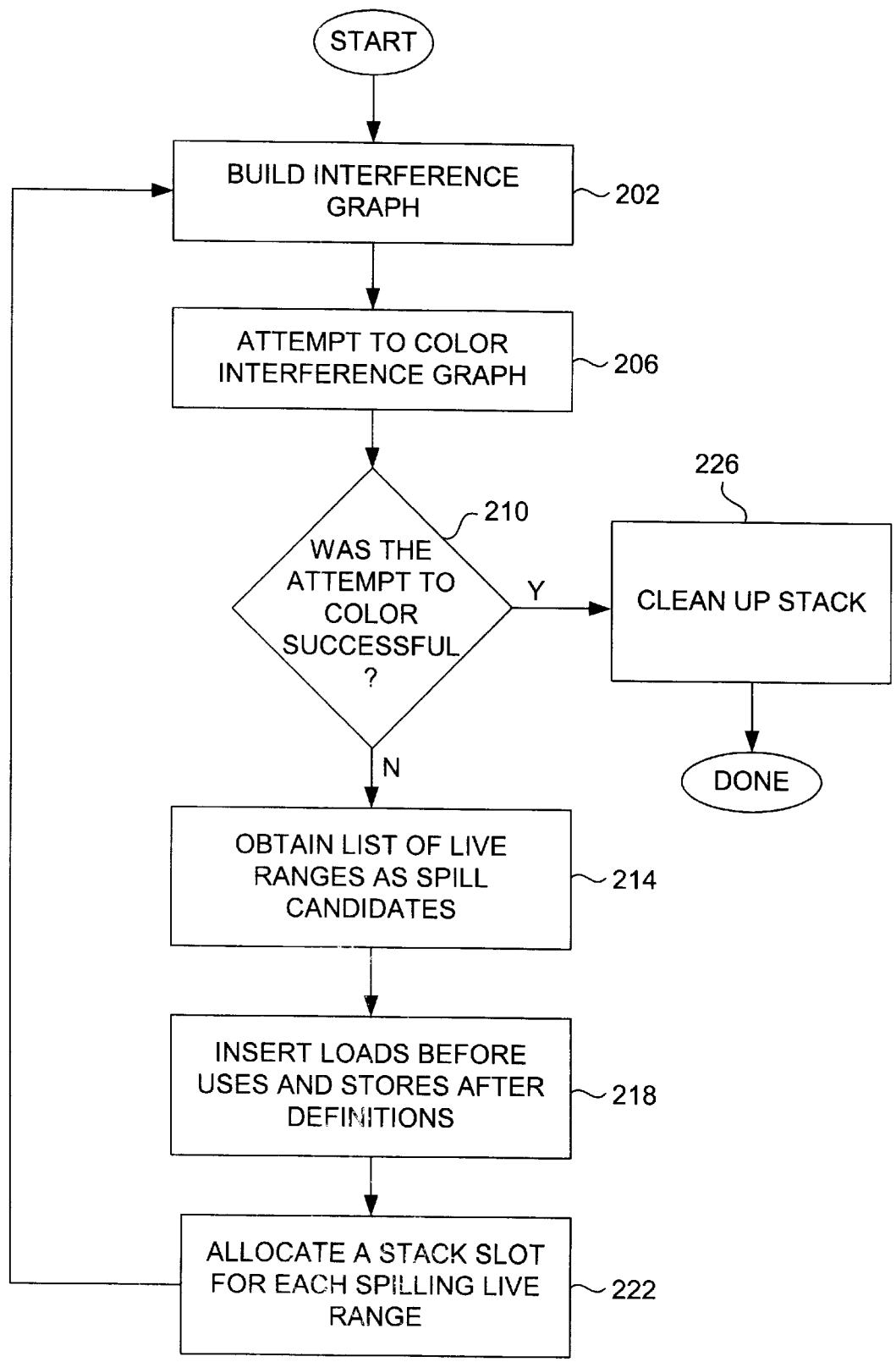
FIG. 2 is a process flow diagram that illustrates the steps associated with allocating stack space in response to coloring an interference graph.
Figure 3A:
FIG. 3a is a diagrammatic representation of source code as augmented with copy instructions in accordance with an embodiment of the present invention.

As will be appreciated by those skilled in the art, a register allocator may perform copy coalescing to eliminate. Therefore, by creating copies of variables that are to be stored in stack slots, a register allocator may ultimately be used to reduce stack slot usage by eliminating unused copies from stack slots. Referring to FIG. 3a, a code segment that includes copy instructions with be described in accordance with an embodiment of the present invention. A code segment 304 includes a command 308, or an instruction, which uses variables A and B in a definition of variable C. In the described embodiment, copy instructions are assigned around definitions of variables and uses of variables. Accordingly, since command 308 uses variables A and B, copies of variables A and B are made as indicated by commands 310 and 312, respectively. A copy command 314 is arranged after command 308 in order to create a copy of variable C.

Stack slots and registers are typically a part of a namespace. In general, the size of a namespace may vary depending upon the number of stack slots associated with the namespace. As the number of registers associated with a processor and, hence, a namespace is typically fixed, it should be understood that the size of a namespace is essentially dependent upon the number of stack slots, or the size of the stack frame created from the stack slots, included in the namespace.

Figure 3B:
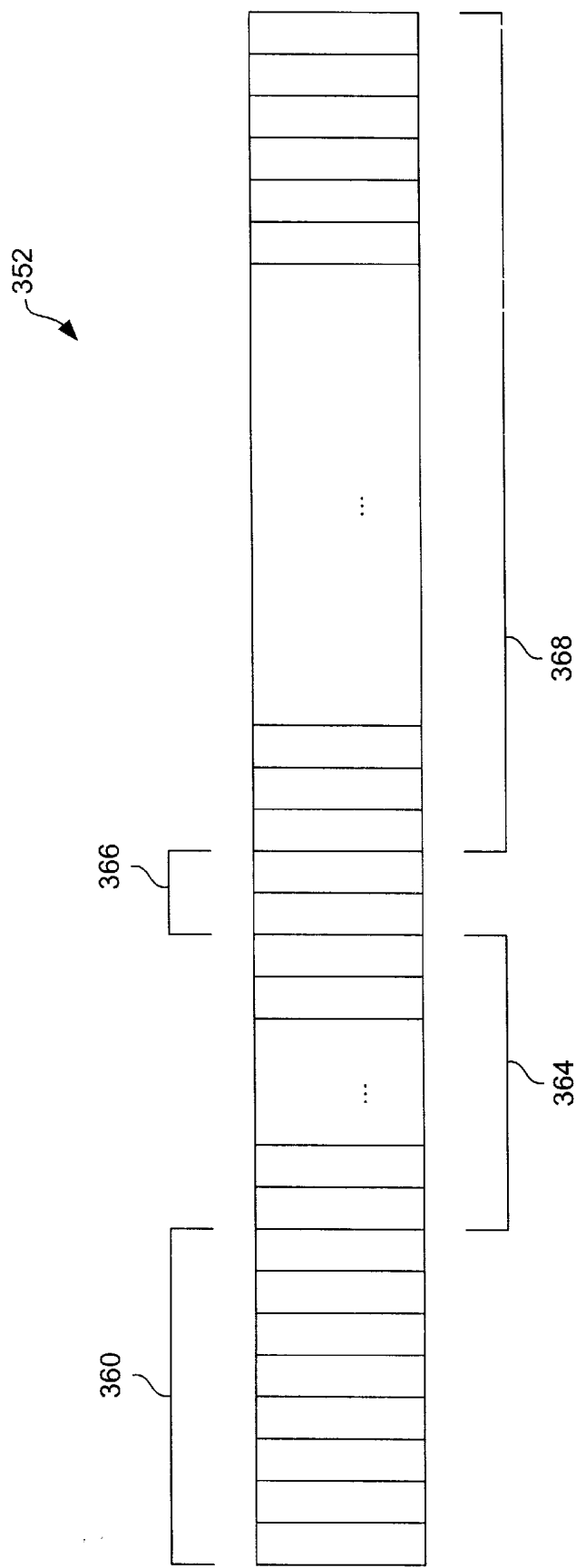
FIG. 3b is a diagrammatic representation of a namespace in accordance with an embodiment of the present invention.

FIG. 3b is a diagrammatic representation of a namespace in accordance with an embodiment of the present invention. A namespace 352 may include any number of bits. In general, the number of bits may vary widely depending upon the requirements of a particular computing system. By way of example, the number of bits may range from approximately 50 bits to more than 100 bits. It should be appreciated that, in theory, the number of bits associated with namespace 352 may essentially be infinite. In the described embodiment, namespace 352 is a 96-bit namespace.

The first eight bits 360 of namespace 352 are associated with registers that hold integers. That is, the first eight bits 360 effectively make up eight integer registers. In general, as will be appreciated by those skilled in the art, the number of bits associated with registers may vary depending upon the computing platform with which namespace 352 is associated. For example, eight bits are associated with registers for an Intel 80×86 central processing unit (CPU), while 32 bits are associated with registers for a RISC CPU. A set of bits 364, i.e., bits nine through twenty-five, are associated with registers that store floating-point values.

In the described embodiment, starting at bit position twenty-six, bits refer to stack slots associated with incoming arguments being passed on the stack. The number of bits assigned to incoming arguments depends on the subroutine being compiled and the calling convention used. Some incoming arguments may be passed in registers. After the incoming argument bits are assigned, the outgoing argument bits are assigned. The outgoing argument bits are typically reserved for arguments being passed to subroutines which are being called by a current subroutine. After the outgoing argument bits are assigned, all remaining bits are assigned for use to represent spills.

It should be appreciated that a register allocator that intends to spill code into stack slots associated with namespace 352 typically selects the first available stack slot, and spills values into that stack slot.

By effectively spilling code sequentially into stack slots, a stack frame, which is composed of stack slots, may be fairly dense, as empty stack slots between used stack slots generally are not present. Further, the lack of empty slots between used stack slots enables a stack frame to be sized such that it is only as large as necessary. Specifically, the size of a stack frame corresponds to the highest stack slot that is used. By way of example, when the thirtieth bit is the last bit in namespace 352 that is filled the size of a stack frame associated with namespace 352 is four words, or 16 bytes.

Figure 4:
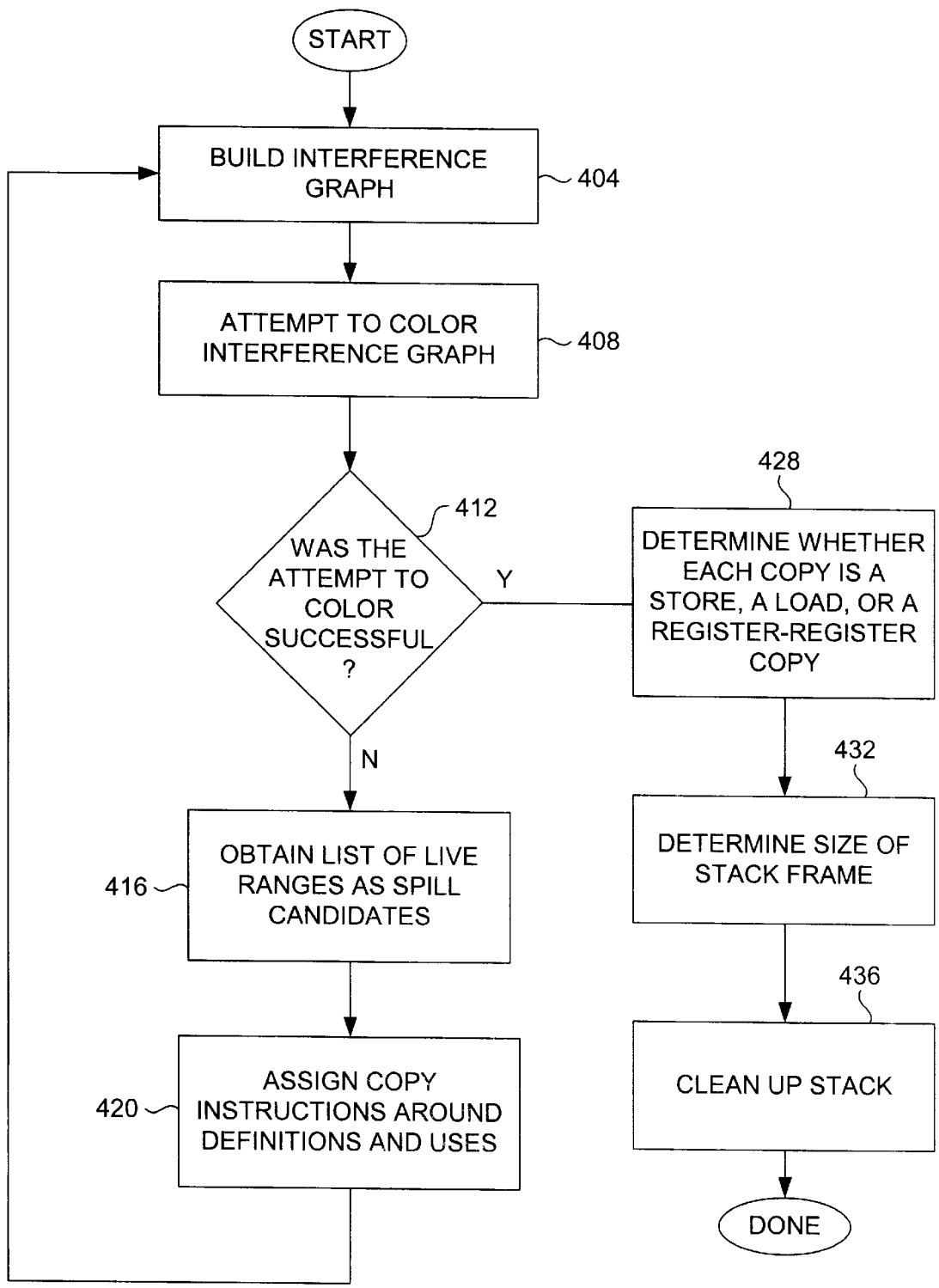
FIG. 4 is a process flow diagram that illustrates the steps associated with allocating stack slots in response to coloring an interference graph in accordance with an embodiment of the present invention.

While stack slots may be allocated for a variety of different reasons, in the described embodiment, stack slots are allocated during a register allocation process when there are substantially no available registers for use. Register allocation processes are often associated with interference graph coloring processes. With reference to FIG. 4, the steps associated with performing an interference graph coloring on source code will be described in accordance with an embodiment of the present invention. The process begins at step 404 in which an interference graph is created, or "built," for a particular segment of source code. The segment of source code may generally be a section of a software application written in substantially any suitable programming language, e.g., the C programming language. In general, the creation of an interference graph involves representing live ranges associated with variables, or values, in the source code and representing interferences between live ranges, as previously discussed.

Once the interference graph is built, then an attempt is made to color the interference graph in step 408. Coloring the interference graph involves assigning registers to different variables without conflicts or interference. As will be appreciated, the methods used to color an interference graph to perform register allocation may vary widely. Such methods may include, but are not limited to, the Briggs-Chaitin register allocation method, the Chow style allocation method, and the linear scan allocation method.

A determination is made in step 412 as to whether the attempt to color the interference graph was successful. In other words, a determination is made regarding whether registers may be assigned to all variables associated with the interference graph without any conflicts. When it is determined that the attempt to color the interference graph was not successful, then the indication is that there are not enough registers to enable all variables associated with the interference graph to be assigned without conflict. Accordingly, process flow moves from step 412 to step 416 where a list of live ranges associated with the interference graph is obtained as spill candidates. That is, values that may be spilled into stack slots are identified.

After spill candidates are identified, in step 420, copy instructions are effectively assigned or inserted around definitions and uses associated with the spill candidates. In the described embodiment, a copy instruction is assigned after a definition associated with a spill candidate and before an instruction that is associated with, e.g., uses, a spill candidate. A copy instruction that is assigned around a definition or a use instruction typically has the appearance of a register-to-register, i.e., "reg-reg," copy instruction. However, as presented in this invention, the "registers" used by the copy may either be actual machine registers or they may be stack slots. As will be appreciated by those skilled in the art, a copy instruction may involve placing values on a stack, but generally does not require placing values on a stack.

Once copy instructions are assigned around definitions and uses associated with the spill candidates in step 420, process flow returns to step 404 where a new interference graph is built. The new interference graph that is built includes live ranges that are allowed to color to stack slot registers.

Returning to step 412 and the determination of whether an attempt at coloring was successful, when it is determined that the attempt was successful, then the indication is that no more spilling is necessary. In other words, when coloring is determined to be successful, then no additional stack slots are required to store variables. Hence, process flow proceeds to step 428 in which each copy associated with copy instructions assigned around definitions and uses is assessed to determine whether it corresponds to a store instruction, a load instruction, or a register-to-register copy instruction. Such a determination is necessary in order to convert the copy instruction into one which corresponds to the actual CPU hardware present.

From step 428, process flow moves to step 432 where the size of a stack frame that includes stack slots allocated in step 424 is determined. While the size of a stack frame may depend upon a variety of different factors, in the described embodiment, the size of the stack frame is dependent upon the largest stack slot in the associated namespace, e.g., the 96-bit namespace described above with respect to FIG. 3b. Once the size of the stack frame is determined, the stack is cleaned in step 436. Cleaning up the stack generally includes converting copies into loads and stores as appropriate. After the stack is cleaned up, the process of performing an allocation on source code is completed.

Figure 5:
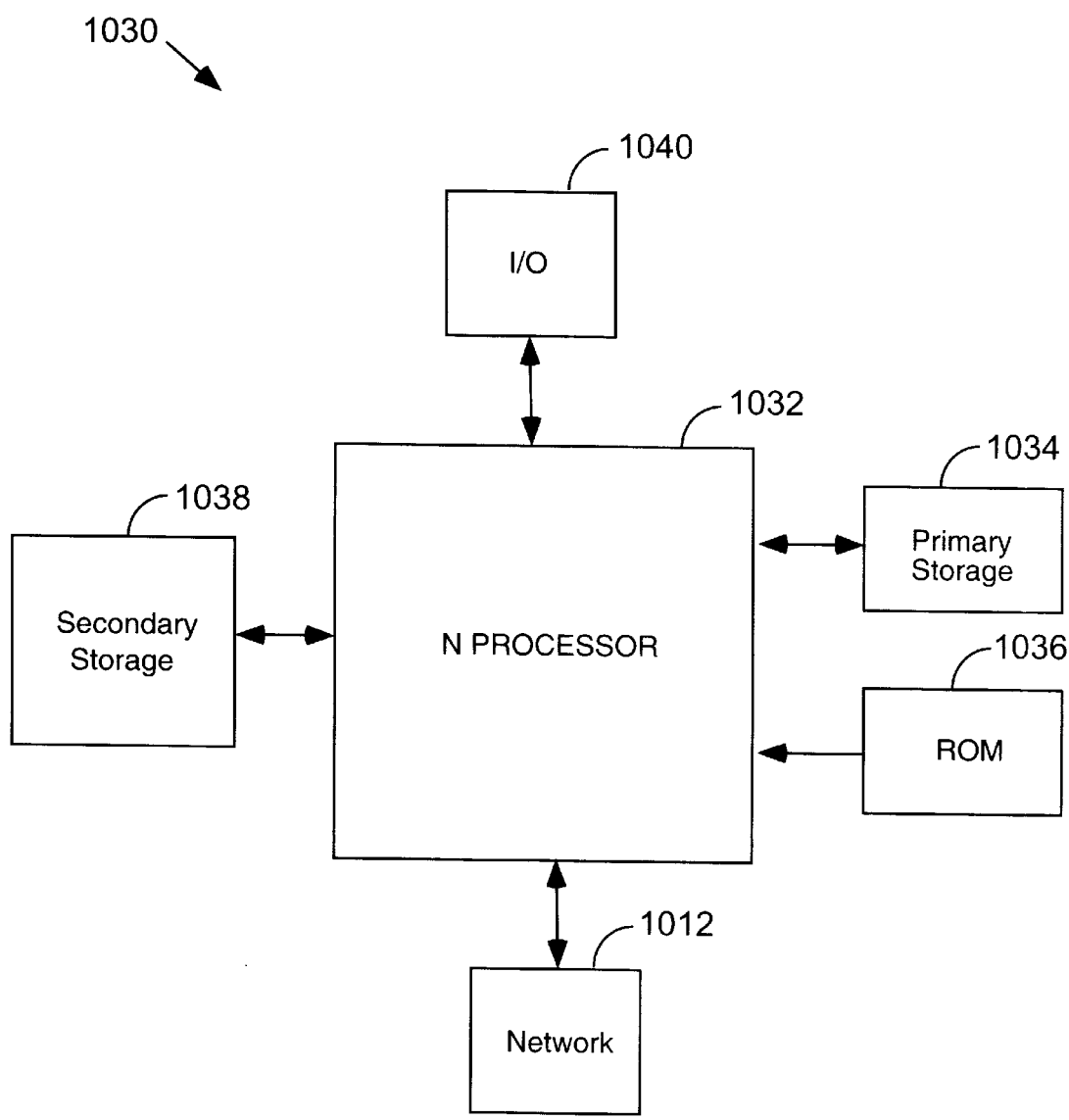
FIG. 5 is a diagrammatic representation of a general-purpose computer system suitable for implementing the present invention.

FIG. 5 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 6. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 6:
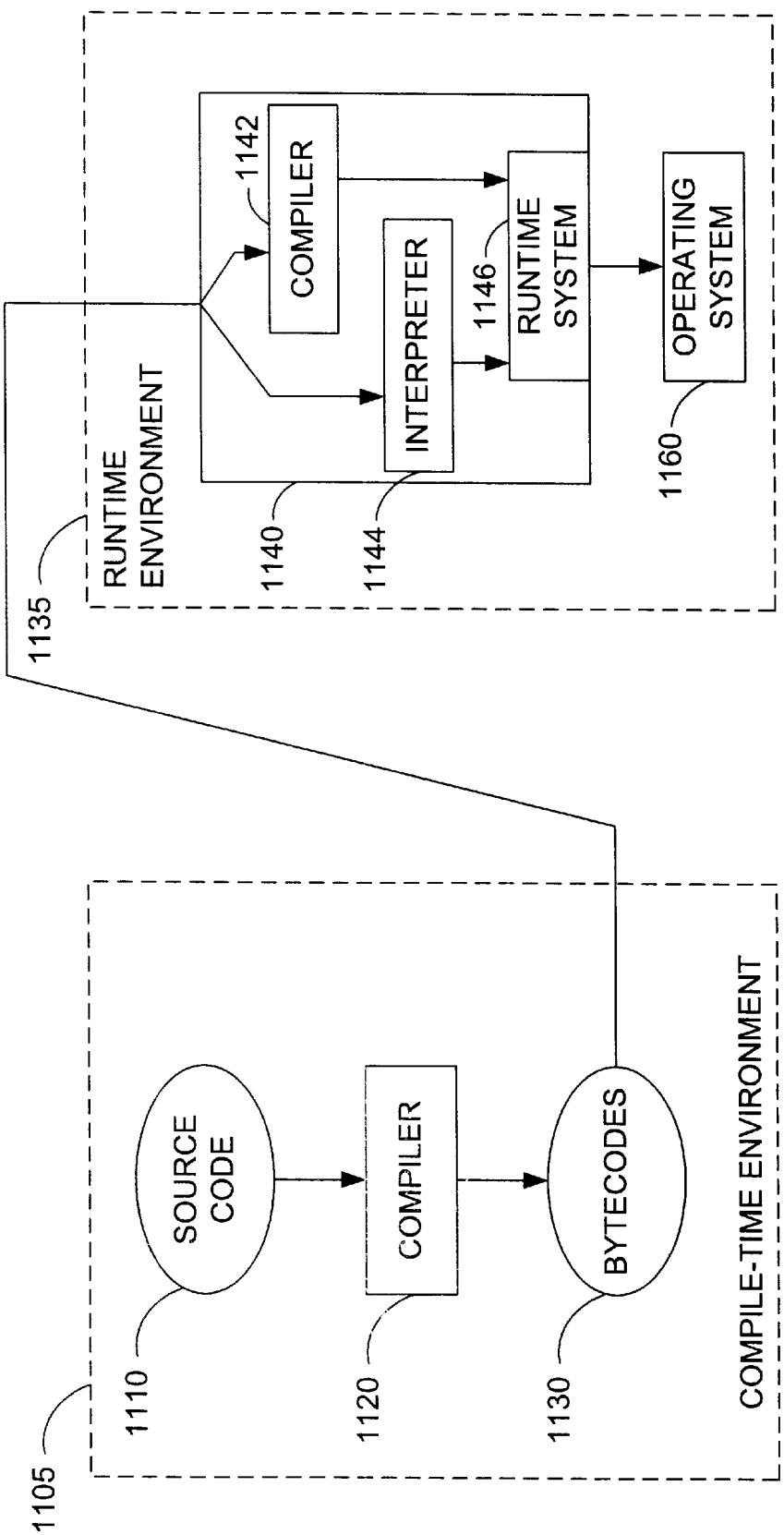
FIG. 6 is a diagrammatic representation of a virtual machine which is supported by the computer system of FIG. 5, and is suitable for implementing the present invention.

As previously mentioned, a virtual machine may execute on computer system 1030. FIG. 6 is a diagrammatic representation of a virtual machine which is supported by computer system 1030 of FIG. 5, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 5, or stored on a storage device such as primary storage 1034 of FIG. 5. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 5. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with allocating stack space and coloring an interference graph may be reordered, removed or added. In general, steps involved with the methods of the present invention may be reordered, removed, or added without departing from the spirit or the scope of the present invention.

While the present invention has generally been described in terms of allocating stack slots to hold spilled data, it should be appreciated that stack slots may be allocated for a variety of different reasons. For instance, in graphical applications, operations such an operation that converts an integer value into a floating-point value may essentially require the allocation of stack slots. Alternatively, stack slots may be allocated to enable arguments to be passed on a stack. Therefore, the present examples are to be considered as illustrative and not restrictive, and the invention is not to be limited to the details given herein, but may be modified within the scope of the appended claims.

What is claimed is:

1. A computer-implemented method for allocating stack space in an object-based system, the computer-implemented method comprising:

a) obtaining source code, the source code being suitable for compilation, the source code including a definition associated with a variable;

b) inserting a first copy instruction in the source code, the first copy instruction being inserted sequentially after the definition associated with the variable;

c) allocating a first stack slot for the first copy instruction; and d) associating the first stack slot with a stack frame, wherein associating the stack slot with the stack frame includes determining a size of the stack frame.

2. A computer-implemented method as recited in claim 1 further including:

e) creating an interference graph associated with the source code, wherein creating the interference graph associated with the source code includes allocating the first stack slot for the first copy instruction;

f) attempting to color the interference graph; and g) determining when the attempt to color the interference graph is successful, wherein the first copy instruction is inserted in the source code when it is determined that the attempt to color the interference graph is not successful.

3. A computer-implemented method as recited in claim 2 further including:

obtaining a spill candidate when it is determined that the attempt to color the interference graph is not successful, the spill candidate being associated with the first stack slot.

4. A computer-implemented method as recited in claim 2 further including repeating steps b), c), e) and f) until it is determined that the attempt to color the interference graph is successful.

5. A computer-implemented method as recited in claim 1 wherein the source code includes at least one use of the variable, and obtaining the source code includes obtaining the at least one use of the variable.

6. A computer-implemented method as recited in claim 5 further including:
   assigning a second copy instruction to the source code, the second copy instruction being arranged to be sequentially located after the at least one use of the variable; and
   allocating a second stack slot for the second copy instruction.

7. A computer-implemented method as recited in claim 1 wherein the first copy instruction is associated with one of a load instruction, a store instruction, and a register-register copy instruction.

8. A computer-implemented method as recited in claim 7 further including determining whether the first copy instruction is a load instruction.

9. A computer-implemented method as recited in claim 7 further including determining whether the first copy instruction is a load instruction.

10. A computer system arranged for allocating stack space in an object-based system associated with the computer system, the computer system comprising:
   a processor;
   a receiving mechanism for obtaining source code, the source code being suitable for compilation, the source code including a definition associated with a variable;
   a compiler mechanism for inserting a first copy instruction in the source code, the first copy instruction being inserted sequentially after the definition associated with the variable;
   a register allocation mechanism for allocating a first stack slot for the first copy instruction, the register allocation mechanism further being arranged to allocate machine registers; and
   a stack frame creation mechanism for associating the first stack slot with a stack frame, wherein associating the stack slot with the stack frame includes determining a size of the stack frame.

11. A computer system according to claim 11 further including:
   a grapher for creating an interference graph associated with the source code;
   a graph coloring mechanism for attempting to color the interference graph; and
   a determinator for determining when the attempt to color the interference graph is successful, wherein the first copy instruction is inserted in the source code when it is determined that the attempt to color the interference graph is not successful.

12. A computer system according to claim 10 wherein the source code includes at least one use of the variable, and the computer system further includes:
   an assigner for assigning a second copy instruction to the source code, the second copy instruction being arranged to be sequentially located after the at least one use of the variable, wherein the register allocation mechanism is further arranged to allocate a second stack slot for the second copy instruction.

13. A computer program product for allocating stack space in an object-based system, the computer program product comprising:
   computer code arranged to obtain source code, the source code being suitable for compilation, the source code including a definition associated with a variable;
   computer code arranged to insert a first copy instruction in the source code sequentially after the definition associated with the variable;
   computer code arranged to allocate a first stack slot for the first copy instruction;
   computer code arranged to associate the first stack slot with a stack frame, the computer code arranged to associate the first stack slot with the stack frame including computer code arranged to determine a size of the stack frame; and
   a computer readable medium that stores the computer codes.

14. A computer program product according to claim 13 wherein the computer readable medium is one selected from the group consisting of a data signal embodied in a carrier wave, a floppy disk, a CD-ROM, a tape drive, an optical drive, flash memory, and a hard drive.

15. A computer program product according to claim 13 further including:
   computer code arranged to create an interference graph associated with the source code;
   computer code arranged to attempt to color the interference graph; and
   computer code arranged to determine when the attempt to color the interference graph is successful, the computer code arranged to determine when the attempt to color the interference graph is successful further being arranged to insert the first copy instruction in the source code when it is determined that the attempt to color the interference graph is not successful.

* * * * *